E. V. HILLBURG.
LEVER LOCK.
APPLICATION FILED MAY 31, 1917.
1,256,132.
Patented Feb. 12, 1918.
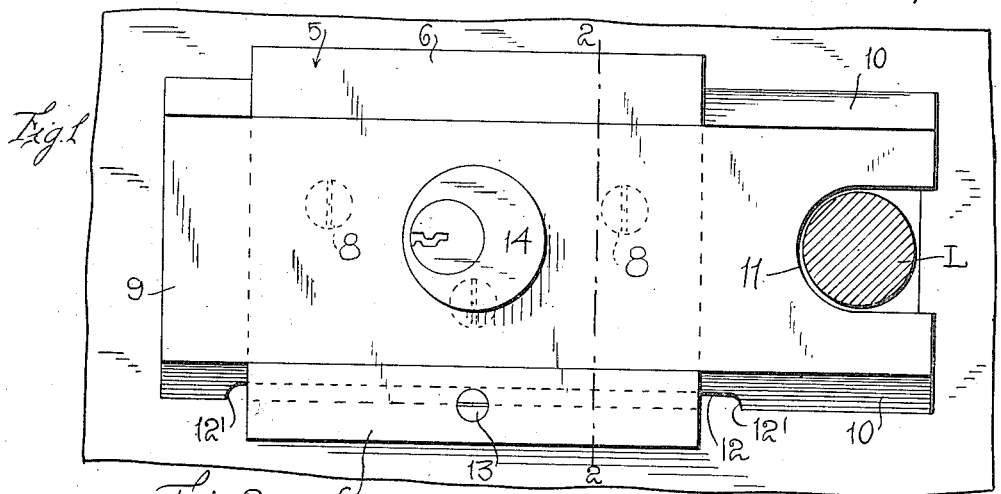
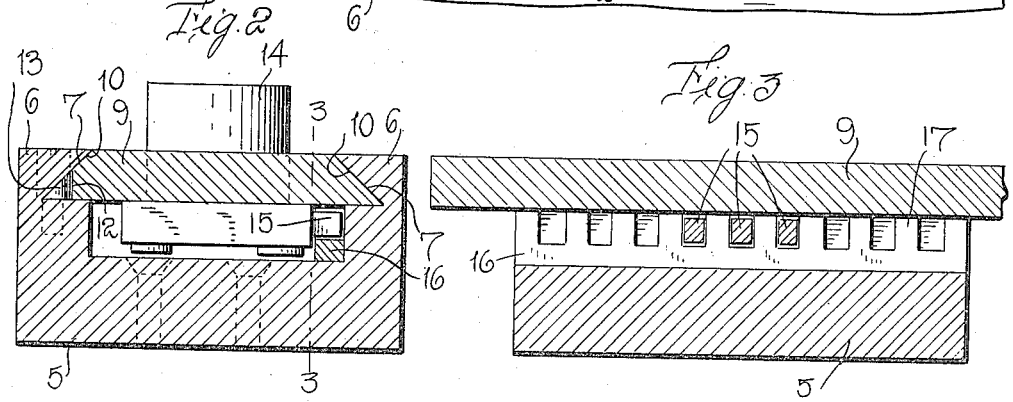
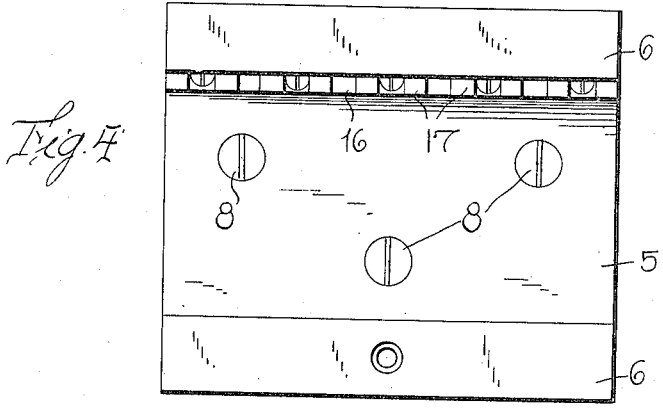
Inventor
E. V. Hillburg.
By Watson E. Coleman
Attorney

UNITED STATES PATENT OFFICE.

ELMER V. HILLBURG, OF McKEES ROCKS, PENNSYLVANIA.

LEVER-LOCK.

1,256,132.

Specification of Letters Patent.   Patented Feb. 12, 1918.

Application filed May 31, 1917. Serial No. 172,005.

*To all whom it may concern:*

Be it known that I, ELMER V. HILLBURG, a citizen of the United States, residing at McKees Rocks, in the county of Allegheny and State of Pennsylvania, have invented certain new and useful Improvements in Lever-Locks, of which the following is a specification, reference being had to the accompanying drawings.

This invention relates to an improved lever lock and has for its primary object to provide a simple and effective device for locking the operating lever of an automobile in its neutral position so that the transmission gears cannot be rendered operative.

It is another important object of the invention to provide a locking device for the above purpose, the parts of which are so constructed and mounted that the fastening screws or other elements are entirely concealed and access thereto prevented when the locking element is engaged with the lever so that the device cannot be bodily removed from its applied position.

It is also a further general object of the invention to provide a lock as above characterized, which consists of relatively few simply constructed parts, so that the device as a whole can be economically produced and whereby the device is rendered easily adaptable for use in connection with different makes of automobiles.

With the above and other objects in view, my invention consists in the novel features of construction, combination and arrangement of parts to be hereinafter more fully described, claimed and illustrated in the accompanying drawing, in which, Figure 1 is a plan view illustrating the preferred embodiment of the invention mounted upon the car floor and showing the operating lever locked in its neutral position;

Fig. 2 is a section taken on the line 2—2 of Fig. 1;

Fig. 3 is a section taken on the line 3—3 of Fig. 2; and

Fig. 4 is a plan view of the base, the shiftable locking plate being removed.

Referring in detail to the drawing, L designates the operating lever of an automobile which may be mounted in any usual or approved manner and provided with the customary rack or frame. As is well known, when the lever is in its substantially vertical position, the engine shaft is disconnected from the driven shaft and the lever is in what is known as its neutral or "dead" position. It is the purpose of my present invention to securely lock the operating lever in this neutral position so that the machine cannot be driven even though the engine is in operation.

The locking device of which I have illustrated one embodiment in the accompanying drawing, includes a metal base 5 which is of rectangular form and is provided upon its opposite longitudinal edges with the flanges 6 having the undercut longitudinally extending grooves 7 formed in their inner faces. This base, between the flanges 6, is provided with a plurality of openings therein to receive the fastening screws indicated at 8, whereby the base may be securely fixed to the floor of the vehicle or to the cover of the transmission case.

9 designates the shiftable locking plate, the opposite longitudinal edges of which are beveled or chamfered, as at 10, for sliding engagement in the grooves or channels 7 of the base 5. This plate 9, in one of its ends, is provided with a recess 11 which is adapted to receive the operating lever L of the machine when said plate is shifted in one direction upon the base. One of the longitudinal edges of the plate 9 is cut away or recessed, as at 12, said recess terminating in spaced relation to the opposite ends of the plate. A stop screw 13 is threaded in one of the flanges 6 of the base 5, centrally thereof, and intersects the outer side of the groove 7. The shoulders 12' at the opposite ends of the recess 12 in the locking plate 9, contact with this screw and limit the sliding movement of the plate in each direction.

A lock, generally indicated by the numeral 14, and which may be of any preferred type, is mounted in the plate 9 and is provided with a shiftable locking bolt having the spaced lugs or fingers 15. This locking bolt is actuated by a suitable key and is shiftable within a casing on the under side of the locking plate 9.

To the base 5 and against the inner side of one of the flanges 6 thereon, a rack bar 16 is secured, the spaced teeth 17 of said bar having their ends disposed flush with the base wall of the groove or channel 7.

In the operation of the device, assuming that the lever L is in its neutral or "dead"

position, the plate 9 is shifted upon the base 5 so as to dispose the lever L within the notch or recess 11 in the end of said plate. A key is then inserted in the lock 14 and the locking bolt shifted transversely to project the fingers 15 thereof into the spaces between the teeth 17 on the rack 16. It will, of course, be understood that the locking bolt may be provided with any desired number of the lugs or fingers 15. In this position of the plate 9, it is to be particularly noted that the screws 8, whereby the base 5 is fixed to the floor of the car, are entirely covered by said plate so that access cannot be had thereto. Thus, the device could not be removed in its entirety from its applied position whereby the lever L could be shifted, and I am enabled to thus materially simplify the construction of such devices by eliminating the necessity of providing lever embracing arms or other elements on the slide plate, and the additional padlock for securing such arms together. When it is desired to release the operating lever, the plate 9 is unlocked from connection with the base and shifted away from the lever, and the lock then again actuated to engage the lugs 14 with other teeth of the rack bar 16 and hold said plate in its inoperative position against sliding movement upon the base. As above stated, the stop screw 13 will prevent the complete disconnection of the locking plate from the base by the engagement of the stop shoulders 12' therewith so that even when this plate is locked in its released position, access to a majority of the fastening screws 8 will be prevented.

From the above description, taken in connection with the accompanying drawing, the construction, manner of operation, and several advantages of the invention will be clearly and fully understood. I have found the locking device to be highly effective and reliable in practical use and of such construction that it can be easily applied to various makes of automobiles for the proper operative engagement of the locking plate 9 with the lever of the machine. It will be understood that the device can be employed in connection with either hand or foot operated levers and with the former either located interiorly or exteriorly of the vehicle body. The several parts of the device are of very simple form and construction so that my improved lock as a whole may be manufactured and sold at relatively small cost. It is apparent that the lever receiving notch or recess 11 may be of various sizes or shapes, in accordance with the particular cross-sectional form of the lever, for engagement therewith. The form, construction, and arrangement of the several other elements above referred to is also susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. In a device of the character described, a base, a rectilinearly movable member mounted upon said base, a rack fixed to the base beneath said member, and key-actuated means carried by said member to co-act with the rack and lock the member in its adjusted position on the base.

2. In a device of the character described, a base and attaching means therefor, a rectilinearly movable member mounted upon said base, key-actuated locking means carried by said member and disposed between the same and the base, said member in one position preventing access to the attaching means for the base, and means on said base with which the locking means on said member is adapted to co-act to secure said member in its adjusted position on the base.

3. In a device of the character described, a base having parallel flanges thereon and guide channels in the opposed faces of said flanges, a shiftable member engaged at its edges in said channels, a key-actuated element mounted upon one side of said member between the same and the base, and means fixed upon the base for engagement by said element to lock the shiftable member in its adjusted position.

4. In a device of the character described, a base having parallel flanges and longitudinally extending guide channels in the inner faces of said flanges disposed in spaced relation to one face of the base, a shiftable plate engaged in said channels and provided with a longitudinal recess in one of its edges, a stop screw in one of the flanges on the base disposed in said recess and limiting the sliding movement of said plate in each direction, a rack fixed to the base, and a key-actuated locking bolt mounted upon one face of said plate for operative engagement with the rack to lock the plate in its adjusted position.

5. In a device of the character described, a base, a locking plate slidably mounted upon said base and provided on one end with means for locking engagement with a lever, said plate being further provided with a longitudinally extending recess in one edge thereof, means fixed in the base extending through said recess and limiting the sliding movement of the plate in each direction, and key-carried means actuated by the plate and co-acting with means on the base to lock the plate against sliding movement.

6. The combination with a lever, of a fixed base adjacent to the lever, a locking plate mounted in spaced relation to one face of the base and having a single plane of movement with respect thereto, said plate having a recess in one end to receive said lever, and a key-actuated locking element carried by the plate and disposed between the same and said base and adapted to co-act with means on the base to lock said plate in an adjusted position.

7. The combination with a lever, of a fixed base adjacent to said lever, a plate mounted upon the base in spaced relation to one face thereof and movable in a single plane with respect to the base, said plate having a recess in one end to receive the lever, a rack secured to the face of said base and over which said plate is disposed, and a key-actuated locking element carried by said plate to co-act with the teeth of the rack and lock the plate in its adjusted position.

In testimony whereof I hereunto affix my signature in the presence of two witnesses.

ELMER V. HILLBURG.

Witnesses:
WILLIAM HUFNAGEL,
HOMER LAMBERT.